US005519421A

United States Patent [19]

Barr et al.

[11] Patent Number: 5,519,421

[45] Date of Patent: May 21, 1996

[54] DISRUPTION OF POLYMER SURFACE OF A NOZZLE MEMBER TO INHIBIT ADHESIVE FLOW

[75] Inventors: Jeffrey H. Barr, San Diego; Hanno Ix, Escondido; Michael P. Caren, San Diego, all of Calif.

[73] Assignee: Hewlett-Packard Company, Palo Alto, Calif.

[21] Appl. No.: 276,733

[22] Filed: Jul. 18, 1994

[51] Int. Cl.$^{6}$ .................... G01D 15/18

[52] U.S. Cl. .................... 347/47; 347/58

[58] Field of Search .................... 347/57, 58, 47

[56] References Cited

U.S. PATENT DOCUMENTS 4,806,106 2/1989 Mebane et al. .................... 347/58

5,278,584 1/1994 Keefe et al. .................... 347/86

5,442,386 8/1995 Childers et al. .................... 347/50

*Primary Examiner*—Benjamin R. Fuller

*Assistant Examiner*—Valerie Ann Lund

[57] ABSTRACT

In an inkjet print cartridge having a polymer nozzle member with windows formed therein for facilitating bonding of conductors to electrodes on a substrate, an adhesive is dispensed through the windows to encapsulate the exposed conductors bonded to the electrodes. The adhesive typically overflows outside the windows. To prevent the adhesive from flowing uncontrolled towards the nozzles formed in the nozzle member, a disruption or surface discontinuity is formed in the nozzle member surface between the windows and the nozzles. This disruption or surface discontinuity may be formed by either scratching, etching, cutting, pressing a blade into, or laser ablating the tape surface, or forming a raised wall on the tape surface, such that the flow of adhesive is inhibited because of mechanical and surface forces.

10 Claims, 3 Drawing Sheets

DISRUPTION OF POLYMER SURFACE OF A NOZZLE MEMBER TO INHIBIT ADHESIVE FLOW

CROSS-REFERENCE TO RELATED PATENT AND APPLICATION

This application is related to and incorporates by reference U.S. Pat. No. 5,278,584, entitled "Ink Delivery System for an InkJet Printhead," by Brian J. Keefe et al., and U.S. application Ser. No. 08/056,238, entitled "Structure and Method for Preventing Ink Shorting of Conductors Connected to a Printhead," by Winthrop Childers et al., both assigned to the same assignee as the present application.

FIELD OF THE INVENTION

The present invention relates generally to inkjet printers and, in particular, to an improved design of an inkjet printhead to increase reliability and manufacturing yield.

BACKGROUND OF THE INVENTION

FIG. 1 illustrates a state-of-the-art Hewlett-Packard inkjet print cartridge 10 which the present invention was designed to improve.

Print cartridge 10 includes an ink reservoir 12 and a printhead 14, where the printhead 14 is formed using Tape Automated Bonding (TAB). The printhead 14 includes a nozzle member 16 comprising two parallel columns of offset nozzles 17 formed in a flexible polymer tape 18 by, for example, laser ablation. The tape 18 may be purchased commercially as Kapton™ tape, available from 3M Corporation. Other suitable tape may be Upilex™ or its equivalent.

A back surface of tape 18, shown in FIG. 2, includes conductive traces 19 formed thereon using a conventional photolithographic etching and/or plating process. These conductive traces 19 are terminated by large contact pads 20 designed to interconnect with printer electrodes, providing externally generated energization signals to the printhead.

The ends of traces 19 are bonded to exposed electrodes 29 (FIG. 3) on a rectangular silicon substrate 28 mounted to the back of nozzle member 16. FIG. 3 is a cross-sectional view along line 3—3 in FIG. 2 showing the connection of traces 19 to electrodes 29 on substrate 28. A barrier layer 30 (formed of, for example, photoresist) is patterned to define ink ejection chambers (not shown) into which ink flows via ink channels 32. Ink is ejected from nozzles 17 as droplets 36 when the ink ejection elements (e.g., heater resistors) are energized by signals applied to electrodes 29. An insulator 42 is formed on substrate 28 to insulate traces 19 from substrate 28.

Windows 44 and 45 extend through tape 18 and are used to facilitate bonding of the ends of the conductive traces 19 to electrodes 29 on substrate 28. Windows 44 and 45 may be formed using conventional photolithographic techniques.

FIG. 4 is a front view of tape 18 removed from print cartridge 10 and prior to windows 44 and 45 being filled with an encapsulant.

After bonding traces 19 to electrodes 29, traces 19 and electrodes 29 remain exposed through the rectangular windows 45 and 46 and must now be protected from ink and physical damage. To provide such protection, beads of an adhesive 48, shown in FIGS. 1 and 3, are dispensed over the exposed traces 19 to encapsulate the traces 19. Adhesive 48 may be a UV cureable adhesive or any other suitable adhesive.

In the manufacturing of the print cartridge 10 shown in FIG. 1, it has been found difficult to dispense the proper amount of adhesive 48 to fully encapsulate traces 19 while at the same time preventing adhesive 48 from flowing too near or over one of the nozzles 17. Adhesive 48 generally has a low viscosity. This low viscosity causes the adhesive 48 which overflows out of the top of windows 44 and 45 to flow easily towards nozzles 17. This adhesive 48, once cured, causes problems with different aspects of the print cartridge 10, including wiping of the nozzles 17 and capping of the nozzle member 16.

FIG. 5 is a top-down view of the nozzle and window portion of printhead 14 showing adhesive 48 overflowing out of windows 44 and 45 and flowing over one or more end nozzles 17. FIG. 6 is a magnified cross-sectional view along line 6—6 in FIG. 5 showing the overflow of adhesive 48 out of window 45 and over nozzle 17.

The main technique used by Hewlett-Packard in the past to prevent the adhesive 48 from flowing too near the nozzles 17 was to adjust the fluid pressure in the adhesive dispenser to change the amount of adhesive 48 being dispensed to match the variable amount needed to fill the window 44 or 45. It was discovered that this was not a satisfactory solution because the variation in the window 44/45 size is relatively great from print cartridge to print cartridge as well as over time. Therefore, the fluid pressure would have to be adjusted for each print cartridge 10 manufactured. This adjustment process also resulted in reduced manufacturing yield since the process eventually produces faulty print cartridges before any problem with adhesive overflow is caught.

What is needed is an inexpensive and reliable method to inhibit the flow of adhesive 48 in a controllable manner over the polymer tape 18 surface.

SUMMARY

The above-described problems with the adhesive flowing uncontrolled towards the nozzles formed in a polymer nozzle member has been solved by creating a disruption or surface discontinuity in the polymer nozzle member surface between the windows and the nozzles. This disruption or surface discontinuity may be formed by either scratching, etching, cutting, pressing a blade into, or laser ablating the tape surface, or even creating a raised wall on the tape surface, such that the flow of adhesive is inhibited because of mechanical and surface forces.

DETAILED DESCRIPTION OF THE PREFERRED EMBODIMENTS

Figure 1:
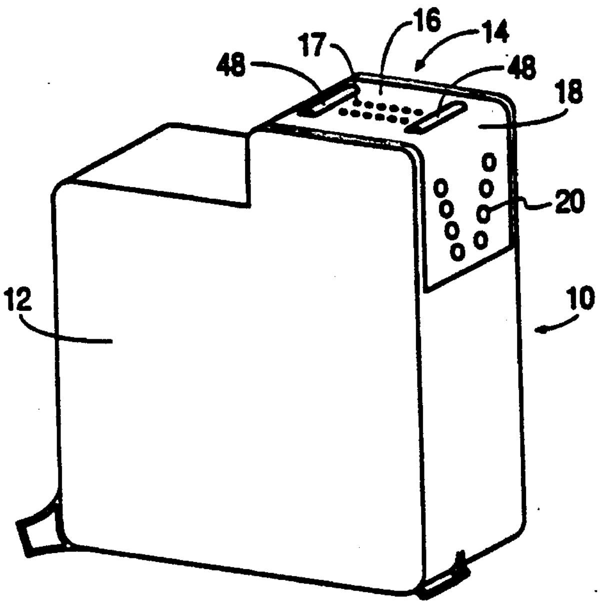
FIG. 1 is a perspective view of an inkjet print cartridge which may utilize the present invention.
Figure 4:
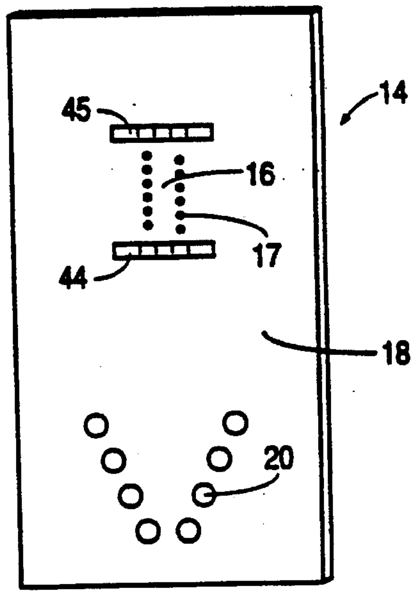
FIG. 4 is an elevated front view of the TAB circuit incorporating a printhead.
Figure 2:
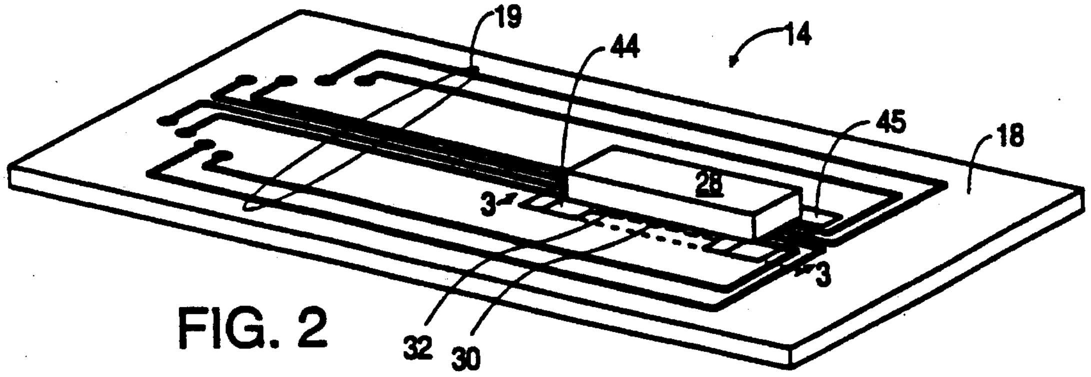
FIG. 2 is a perspective view of the back surface of the polymer tape/TAB circuit of FIG. 1 with a silicon substrate mounted thereon and conductive leads bonded to electrodes on the substrate.
Figure 3:
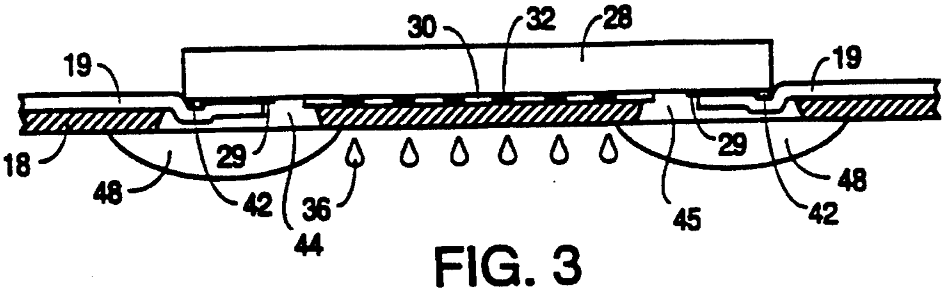
FIG. 3 is a cross-sectional view along line 3—3 in FIG. 2 the TAB circuit.
Figure 7:
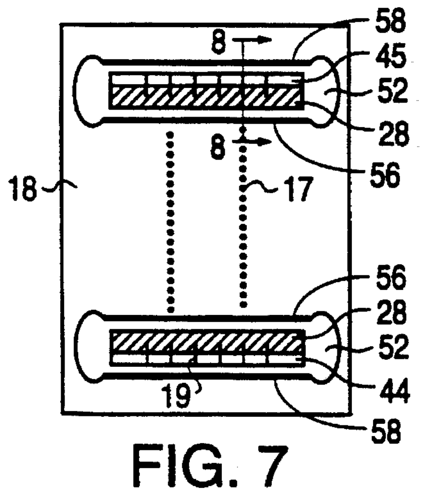
FIG. 7 is a top-down view of a polymer nozzle member having a disruption or a surface discontinuity formed between the windows and the nozzles formed in the nozzle member.

FIG. 7 is a top-down view of one embodiment of the invention showing the pertinent portion of polymer tape 18 having nozzles 17 formed therein by laser ablation. Raised beads of an adhesive 52 (e.g., a UV cureable adhesive) are shown filling windows 44 and 45 to encapsulate traces 19 connected to electrodes on a substrate 28. The polymer tape 18 forms part of a TAB circuit identical to that shown in FIGS. 2–4. It will be assumed that the adhesive 52 is transparent so that windows 44 and 45 may be seen, although the adhesive 52 used may be translucent or opaque.

Figure 5:
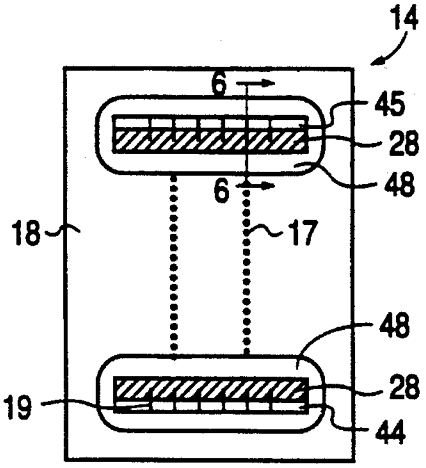
FIG. 5 is a top-down view of a polymer nozzle member portion of the TAB circuit illustrating the uncontrolled flow of an adhesive filling the windows
Figure 6:
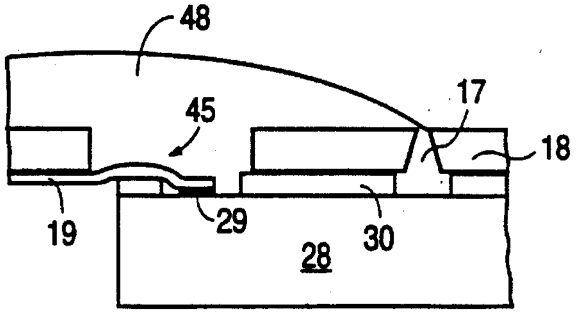
FIG. 6 is a cross-sectional view along line 6—6 in FIG. 5 illustrating the effects of uninhibited adhesive flow across the top surface of the polymer nozzle member.

In contrast to the portion of tape 18 shown in FIG. 5, a surface discontinuity or disruption 56 is formed in or on the top surface of the polymer tape 18 between each of windows 44 and 45 and nozzles 17. Although disruption 56 alone may solve the problems previously discussed, a second disruption 58 placed on the opposite side of windows 44 and 45 may also be formed to limit of the flow of adhesive 52 away from nozzles 17.

In one embodiment, the width of windows 44 and 45 is approximately 22 mils; the length of windows 44 and 45 is approximately 190 mils; the length of disruptions 56 and 58 is approximately 210 mils; the width of each of disruptions 56 and 58 is approximately 2 mils; the separation between disruption 56 and the closest nozzle 17 is approximately 20 mils; the separation between disruption 58 and the closet nozzle 17 is approximately 65 mils; and the separation between the edge of windows 44 or 45 and the closest disruption 56 or 58 is approximately 10 mils. These dimensions, however, would of course be modified depending upon the particular requirements of the printhead 14. What is important is that the length and shape of disruption 56 be sufficient to predictably limit the flow of adhesive 52 towards nozzles 17 so that the separation between adhesive 52 and the end nozzles 17 may be reliably maintained even though the window 44/45 size and window volume may vary from print cartridge to print cartridge.

Figure 8:
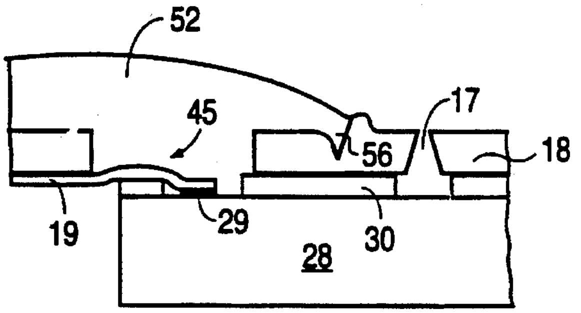
FIG. 8 is a cross-sectional view along line 8—8 in FIG. 7 illustrating the inhibition of adhesive flow by pressing a blade into the nozzle member.

FIG. 8 is a cross-sectional view of a portion of the tape 18 shown in FIG. 7 along line 8—8 showing disruption 56 being formed by a blade pressed into tape 18. In one embodiment, disruption 56 is spaced approximately 10 mils from the closest edge of window 45 and approximately 20 mils from the first nozzle 17. Also shown in FIG. 8 is a portion of substrate 28, barrier layer 30, conductive traces 19, and substrate electrode 29. As seen, the bead of adhesive 52 flows up to the disruption 56 but is inhibited from flowing past the disruption 56 towards nozzle 17. The bead of adhesive 52, in one embodiment, has a variable height of between 0.1 and 0.5 mm, depending upon the variable volume of the window 44 or 45. In the preferred embodiment, the amount of adhesive dispensed in each window 44 or 45 is intended to be constant.

A second disruption 58 (shown in FIG. 7) to the left of window 45 in FIG. 8 is not shown for simplicity. Disruption 58 may or may not be needed to restrict the flow of adhesive 52, depending on the particular configuration of the print cartridge. The second disruption 58 may be symmetrical with disruption 56 to likewise inhibit adhesive 52 flow away from window 45.

Figure 9:
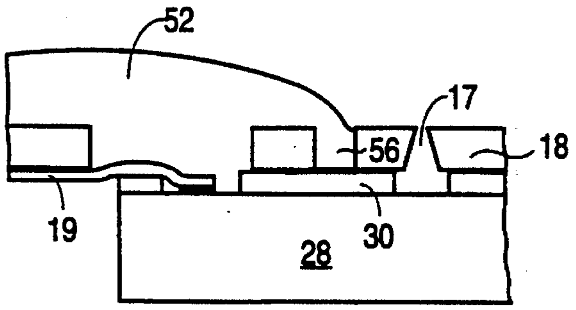
FIG. 9 is a cross-sectional view along line 8—8 in FIG. 7 illustrating the inhibition of adhesive flow by cutting through the nozzle member.

FIG. 9 shows another embodiment of the invention where disruption 56 is formed by a gap extending completely through tape 18. As seen, this disruption 56 also inhibits the flow of adhesive 52 from extending past disruption 56. This gap may be formed by mechanical stamping or by chemical etching using a photolithographic process, as would be well known to those skilled in the art.

Figure 10:
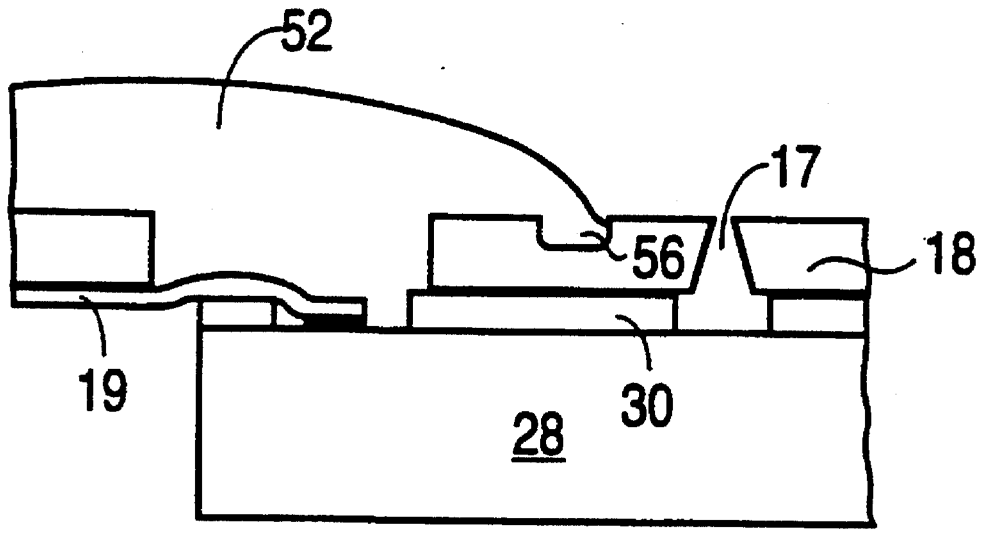
FIG. 10 is a cross-sectional view along line 8—8 in FIG. 7 illustrating the inhibition of adhesive flow by laser ablating, scratching, or etching a surface disruption in the nozzle member.

FIG. 10 illustrates yet another embodiment of the invention where a laser is used to ablate a portion of the polymer tape 18 surface to form disruption 56. FIG. 10 also serve to illustrate the appearance of the tape 18 surface when disruption 56 is formed by chemical etching using a photolithographic process. Forming disruption 56 by mechanically scratching the surface of tape 18 will form a similar disruption 56.

Figure 11:
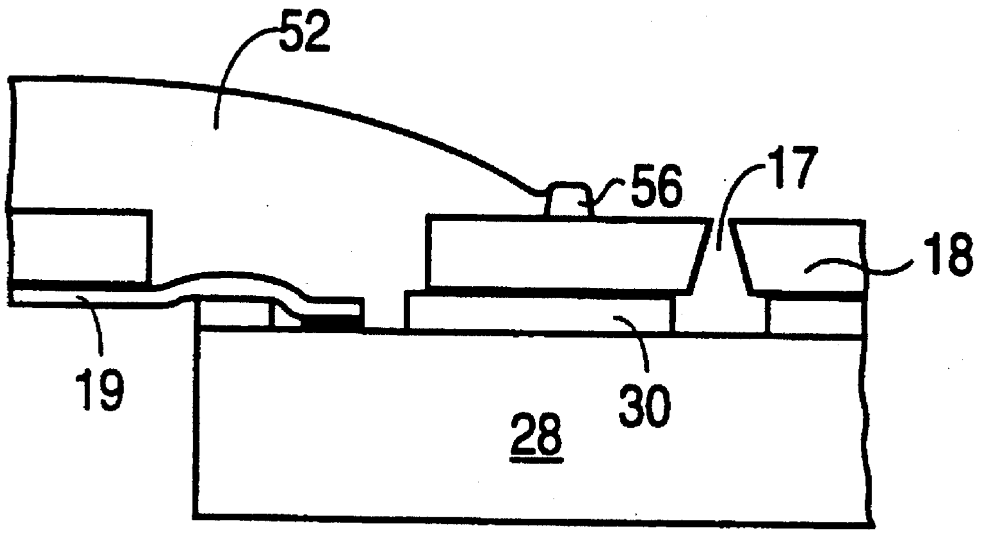
FIG. 11 is a cross-sectional view along line 8—8 in FIG. 7 illustrating the inhibition of adhesive flow by forming a raised wall on the nozzle member.

FIG. 11 illustrates how disruption 56 can be formed by providing a raised wall to block the flow of adhesive. Such a raised wall may consist of a strip of the same conductive material used to form traces 19 on the back surface of tape 18. Such a raised wall may be formed using well-known photolithographic processes and may be formed of any suitable material. The raised wall may also be formed by depositing a strip of glue or other suitable material.

Other ways to etch or form disruption 56 include reactive ion etching, ion beam milling, and molding or casting on a photo-defined pattern. The various methods described to form disruptions 56 and 58 may be carried out in a step-and-repeat reel-to-reel process along with the processes used to form windows 44 and 45 and nozzles 17.

Other adhesives 52 which may be used include hot-melt, silicone, epoxy, and mixtures thereof.

The thickness of tape 18 is desirably on the order of a few mils (e.g., approximately 2 mils), and, in a preferred embodiment, disruptions 56/58 exceed approximately one-quarter mil in depth or height. The required depth and width of disruptions 56/58 to adequately inhibit adhesive 52 flow, of course, depends on the anticipated maximum overflow of adhesive 52 and the viscosity of the adhesive 52, among other factors. Such required dimensions of the disruptions 56/58 may be determined empirically.

In a preferred embodiment, the disruptions 56/58 extend along the entire length of the windows 44/45 so that there are no bleed points along the windows 44/45. This keeps the adhesive 52 within well-defined dimensions along the entire width of the wiping/capping areas.

Advantages of forming disruptions 56/58, instead of adjusting the fluid pressure of the adhesive 52 (i.e., the amount of adhesive dispensed), include: making the adhesive dispensing process more independent of processes that come before it; and eliminating the adverse effects of adhesive 52 overflowing out of windows 44/45. Thus, by using the invention, there is a higher degree of control over the final adhesive dimensions and a concomitant increase in manufacturing yield and reliability.

While particular embodiments of the present invention have been shown and described, it will be obvious to those skilled in the art that changes and modifications may be made without departing from this invention in its broader aspects and, therefore, the appended claims are to encompass within their scope all such changes and modifications that fall within the true spirit and scope of this invention.

What is claimed is:

1. A printhead structure comprising:

a polymer nozzle member having nozzles formed therein;

a semiconductor substrate mounted to a back surface of said nozzle member, said substrate having one or more electrodes formed thereon bonded to one or more conductors leading away from said substrate;

said nozzle member having a window formed therein for providing access to said conductors and electrodes from a front surface of said nozzle member to thus enable bonding of said conductors to said electrodes, said window being separated from said nozzles by a predetermined distance, said nozzle member having formed therein a disruption in said front surface of said nozzle member between said window and said nozzles; and an adhesive disposed in said window for substantially encapsulating said conductors exposed by said window, said disruption inhibiting a flow of said adhesive towards said nozzles.

2. The structure of claim 1 wherein said disruption is laser ablated into said front surface of said nozzle member.

3. The structure of claim 1 wherein said disruption consists of a gap in said nozzle member extending completely through a thickness of said nozzle member.

4. The structure of claim 1 wherein said disruption is a raised wall on said front surface of said nozzle member.

5. The structure of claim 1 wherein said disruption extends at least a length of said window.

6. The structure of claim 1 wherein said disruption has a depth or height of at least approximately one-quarter mil.

7. The structure of claim 1 further comprising a second disruption formed in said front surface of said nozzle member on a side of said window opposite a side of said window facing said nozzles to inhibit a flow of said adhesive beyond said second disruption.

8. The structure of claim 1 wherein said disruption is etched into said front surface of said nozzle number.

9. The structure of claim 1 wherein said disruption is formed by pressing a blade into said front surface of said nozzle member.

10. The structure of claim 1 wherein said disruption is formed by scratching said front surface of said nozzle member.

* * * * *